Sept. 26, 1933.  M. LEUPOLD  1,928,567
VACUUM BRAKING AND CLUTCH MECHANISM FOR VEHICLES
Filed May 10, 1930  3 Sheets-Sheet 1
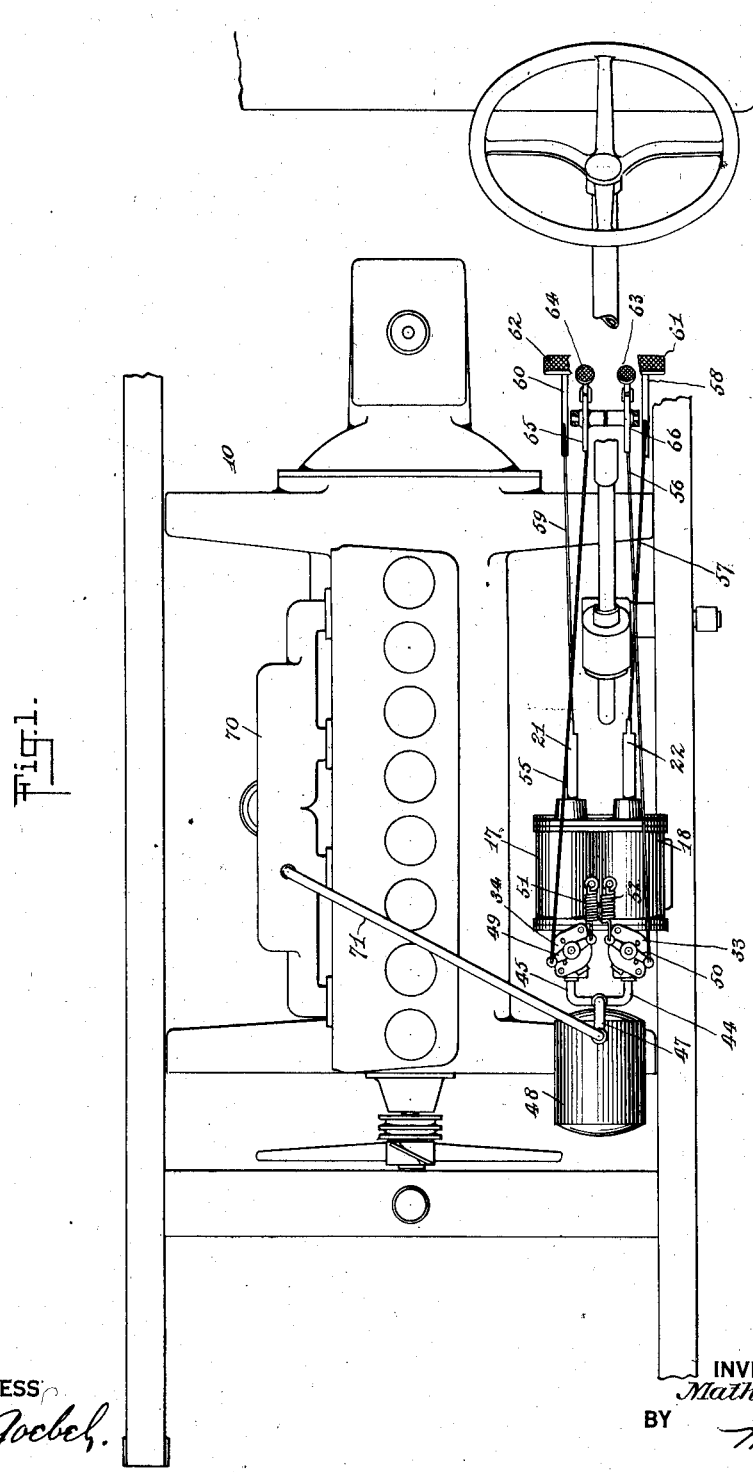
WITNESS
INVENTOR
*Mathias Leupold*
BY
ATTORNEYS

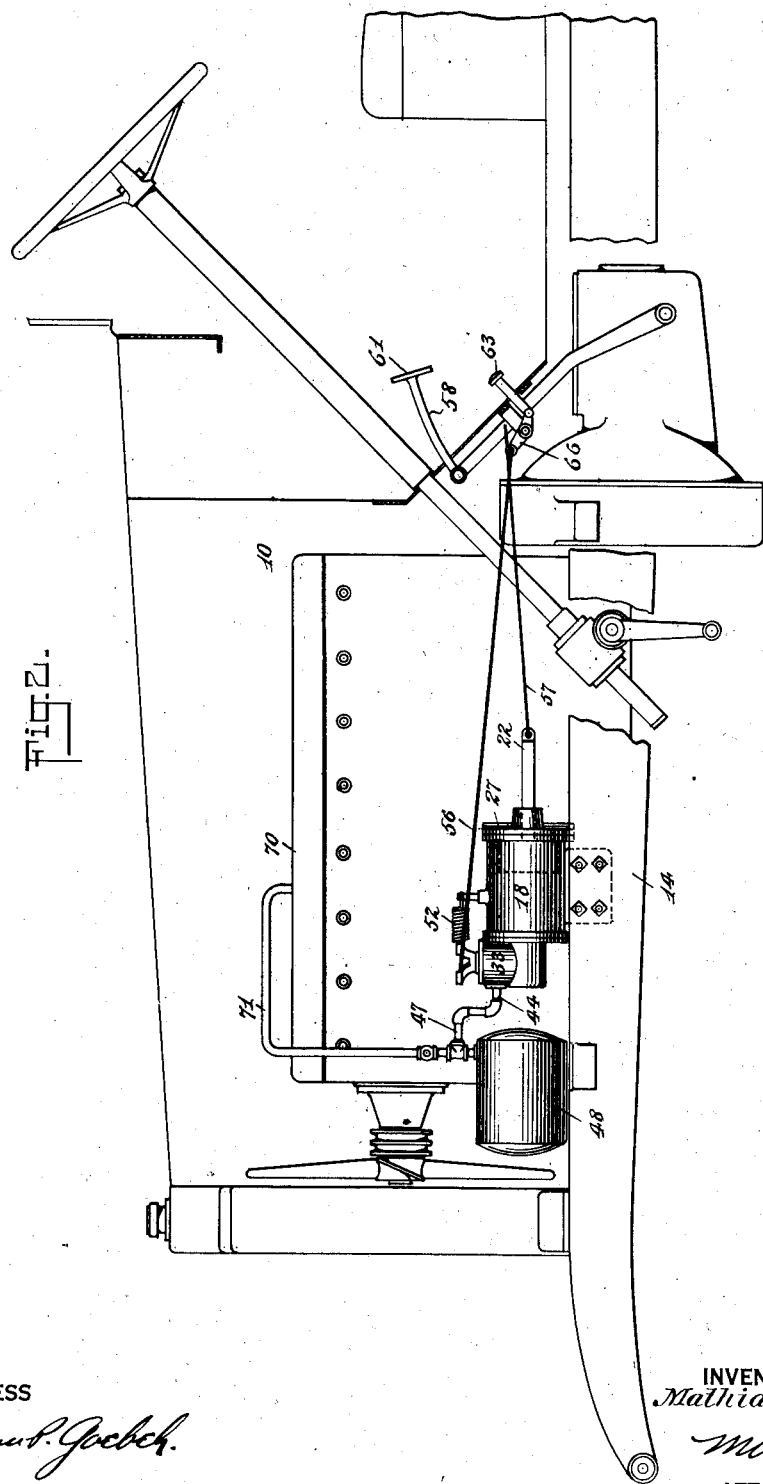

Sept. 26, 1933.  M. LEUPOLD  1,928,567
VACUUM BRAKING AND CLUTCH MECHANISM FOR VEHICLES
Filed May 10, 1930  3 Sheets-Sheet 3
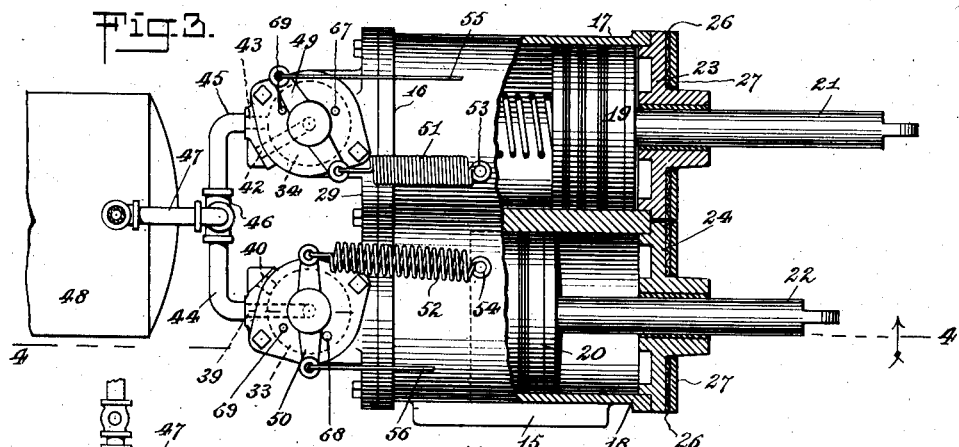
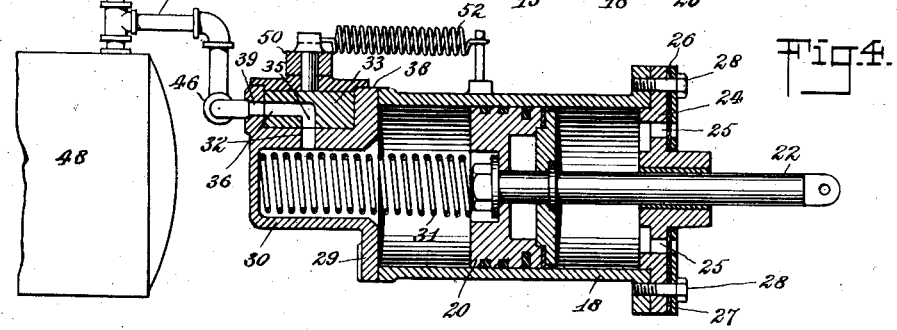
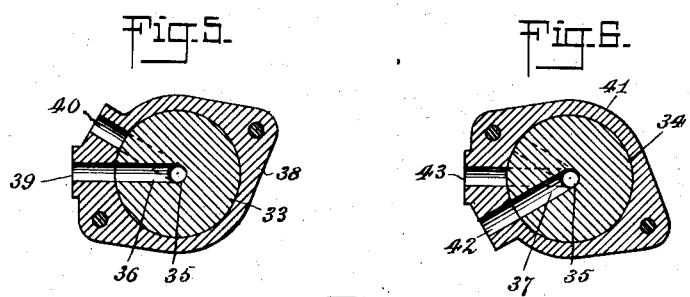
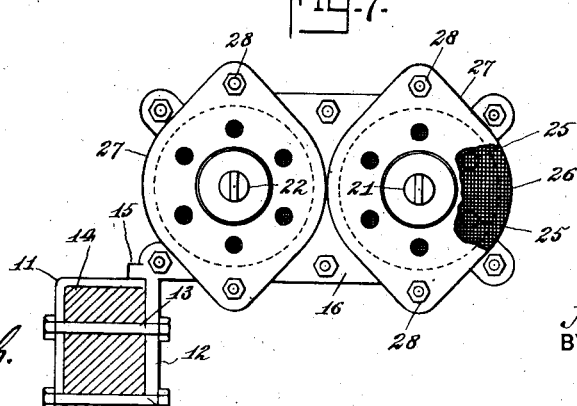
WITNESS
INVENTOR
Mathias Leupold
BY
ATTORNEYS Patented Sept. 26, 1933

1,928,567

UNITED STATES PATENT OFFICE 1,928,567

VACUUM BRAKING AND CLUTCH MECHANISM FOR VEHICLES

Mathias Leupold, Jamaica, N. Y.

Application May 10, 1930. Serial No. 451,469

4 Claims. (Cl. 192—13)

My invention comprises an improved vacuum means for operating a brake for a vehicle.

The invention further comprehends a vacuum means for operating a clutch mechanism of an automotive vehicle.

The invention further comprehends a braking or a clutch operating mechanism operable by suction at the exterior of the engine by fluids passing through the engine and controlled by valve means.

In order to insure a desired vacuum at all times, it would be desirable to include in the system a vacuum tank, and the invention further comprehends such a vacuum tank, the function of which is to equalize the fluctuations in the available vacuum, but it will be understood that the mechanism will operate without this vacuum tank.

Another object of the invention is to provide a cylinder connected by a valve with the vacuum so that a piston in the cylinder may be operated under the influence of the vacuum to control the braking or clutch operating mechanism.

Still another object of the invention is to provide two pedals disposed close together and side by side to be operated by one foot, one of the pedals being connected for operating a brake control mechanism and the other pedal being connected for operating a clutch control mechanism.

Still another object of the invention is to provide vacuum means controlled by pedals for operating the brake and clutch mechanism of the automotive vehicle.

Additional objects of the invention will appear in the following specification in which the preferred form of the invention is set forth.

In the drawings similar reference characters refer to similar parts in all the views, of which Figure 1 is a fragmentary plan view of an automotive vehicle showing my invention applied thereto, Figure 2 is a side elevation of Figure 1, parts being shown in section, Figure 3 is an enlarged sectional plan view illustrating the cylinders, a fragment of the vacuum tank and the connections including the valves between the vacuum tank and the cylinders, Figure 4 is a sectional view on the line 4—4, of Figure 3, Figure 5 is an enlarged sectional plan view of the valve for the clutch cylinder.

Figure 6 is an enlarged sectional plan view of the valves for the brake cylinder, and Figure 7 is an end view of the brake and clutch cylinders with the parts broken away to illustrate the air strainer screen and with a portion of the automotive vehicle illustrated in section to which the cylinders are secured.

While many attempts have been made to provide an automotive vehicle having convenient means for controlling the clutch and the brake, these efforts for one reason or another have not been found to be satisfactory at all times. The invention which is the subject matter of the present application overcomes these objections inasmuch as the brake and the clutch may be controlled with only a limited movement of the left foot, while the right foot is disposed at the accelerator. Further, a vacuum is used to operate the power means for controlling the brake and the clutch with atmospheric pressure, it therefore being possible for the driver by controlling the vacuum to operate the brake and the clutch with very little movement of his foot and with very little pressure.

By referring to the drawings it will be seen that the automotive vehicle 10 has a member 11 to which a bracket 12 is secured in any desired manner, as, for instance, by bolts 13 with a member 14 disposed between the member 11 and the bracket 12. This bracket 12 preferably has an arm or flange 15 which is disposed at the top of the member 11. The bracket 12 carries a block 16 having the brake cylinder 17 and the clutch cylinder 18, these cylinders 17 and 18 being preferably disposed side by side, as illustrated in Figure 3. Disposed in the cylinder 17 there is a piston 19 and disposed in the cylinder 18 there is a piston 20, these pistons being provided with the usual piston rings, the piston 19 having a piston rod 21 and the piston 20 having a piston rod 22, the piston rod 21 being disposed through an opening in the cylinder head 23 and the piston rod 22 being disposed through an opening in the cylinder head 24, these cylinder heads 23 and 24 having apertures 25 therein, as illustrated in Figure 4 of the drawings. Disposed at the outer side of the cylinder heads 23 and 24 there are air strainer screens 26 and at the outer side of the air strainer screens 26 there are disposed cover plates 27 which are held in position by means of bolts 28.

The cylinders 17 and 18 are also provided with cylinder heads 29 which are elongated and have openings 30 in which springs 31 are disposed, these springs pressing against the pistons 19 and 20 to hold the pistons yieldingly adjacent the cylinder heads 23 and 24.

In the cylinder heads 29 there are valve inlets 32 which afford communication with the elongated openings 30, as illustrated in Fig. 4 of the drawings. Disposed above these valve inlets 32 there are valves 33 and 34, the valve 33 controlling the inlet to the clutch cylinder 18, as illustrated in Figure 5 of the drawings, and the valve 34 controlling the inlet to the brake cylinder 17, as illustrated in Figure 6 of the drawings. Each of these valves 33 and 34 has a passage 35 communicating with the inlets 32 respectively, the valve 33 having a lateral passage 36 from its passage 35 and the valve 34 having a lateral passage 37 from its passage 35. The clutch valve casing 38 has two passages 39 and 40, and the brake valve casing 41 has two passages 42 and 43. The passage 39 is connected with a pipe 44 and the passage 43 is connected with a pipe 45, these pipes being connected by a coupling 46 with a pipe 47 which communicates with a vacuum tank 48.

The valve 34 is controlled by a lever 49 and the valve 33 is controlled by a lever 50, an arm of the lever 49 having a spring 51 secured thereto and an arm of the lever 50 having a spring 52 secured thereto, these springs 51 and 52 being secured to the cylinders 17 and 18 respectively by means of pins 53 and 54. These springs 51 and 52 serve to hold the valves 33 and 34 with their passages 36 and 37 at the passages 40 and 42, these passages 40 and 42 communicating with the atmosphere. It will, therefore, be seen that when the valves 33 and 34 are in these positions there will be atmospheric pressure at both sides of the pistons 19 and 20 and the springs 31 will serve to hold the pistons 19 and 20 adjacent the cylinder heads 23 and 24. However, when the cords or members 55 and 56, which are also secured to the levers 49 and 50, are operated and drawn forwardly they will serve to move the levers 49 and 50 against the resiliency of the springs 51 and 52 to bring either or both of the valves 33 and 34 to positions where their passages 36 and 37 will communicate with the passages 39 and 43, thereby permitting the cylinders to communicate with the vacuum tank 48, which will serve to move one or both of the pistons 19 and 20 to the left, which will draw inwardly their piston rods 21 and 22.

The piston rod 22 is connected by means of a member 57 with the standard clutch operating lever 58 and the piston rod 21 is connected by a member 59 with the standard brake operating lever 60 having the usual clutch pedal 61 and the usual brake pedal 62, and between these pedals 61 and 62 there is an auxiliary clutch pedal 63 and an auxiliary brake pedal 64, these auxiliary pedals 63 and 64 being disposed close together and side by side so that they may be operated selectively or simultaneously by one foot of the person driving the car. The pedal 64 is connected with a lever 65 to which the member 55 is secured and the pedal 63 is connected with a lever 66 to which the member 56 is secured. Therefore, when the auxiliary brake pedal 64 is actuated it will serve to operate the lever 49, which will move the valve 34 from a position where its passage 37 communicates with the atmosphere to a position where the said passage 37 communicates with the passage 43, when the vacuum tank will serve to reduce the pressure in the cylinder 17 which will serve to move the piston 19 to the left, thereby operating the standard brake mechanism. In a similar way when the auxiliary clutch pedal 63 is actuated it will serve to move the lever 50 which will operate the valve 33 to move the valve 33 from a position where its passage 36 will communicate with the atmosphere through the passage 40 to a position where its passage 36 communicates with the passage 39 thereby, by means of the vacuum tank 48, reducing the pressure in the clutch cylinder 18, which will serve to move the piston 20 to the left and by the means described operate the standard clutch mechanism.

There is a stop 67 on the casing of the valve 34 and there is a stop 68 on the casing of the valve 33, the stop 67 being positioned to permit the valve 34 to pass from a position where its passage 37 communicates with the passage 42 to a position where its passage 37 communicates with the passage 43 and beyond the last mentioned position so that communication will be cut off between the cylinder 17 and the atmospheric passage 42, and also the vacuum tank through the passage 43. Therefore, when the brakes are applied it is possible to effect the desired reduction in pressure in the cylinder 17 so that the brakes may be applied as may be desired, after which the passage 37 in the valve 34 may be moved beyond the passage 43 to hold this pressure. Should it be desired to further reduce the pressure in the cylinder 17 the valve 34 may be permitted to move to a position where its passage 37 will again communicate with the passage 43, or should it be desired to increase the pressure in the cylinder 17 the valve 34 may be moved to permit its passage 37 to communicate with the passage 42. In this way the brakes may be applied through a movement of the auxiliary brake pedal 64 to apply the brakes, increase the brake pressure, or to free the brakes. While the valve 33 for operating the clutch may be similarly arranged it is not in most cases necessary, and, therefore, the valve 33 has been shown with the stop 68 positioned to limit the movement of the valve 33 so that its passage 36 may communicate with the passages 39 and 40 and movement beyond the said passages 39 and 40 is prevented. Additional stops 69 are provided to limit the movement of the valves 34 and 33 in their movement at the atmospheric passages 42 and 40.

As shown in Figures 1 and 2, the vacuum tank 48 is connected with the engine manifold 70 by means of a pipe 71, but it will be understood that this pipe 71 may be disposed at any desired position on the engine where the pressure in the pipe 71 will be reduced as fluids pass into and out of the engine during its operation.

What is claimed is:

1. An automotive vehicle having an engine in which fluids enter and leave the engine, a tank, means connected with the tank in which pressure is reduced by the flow of the fluids without the engine, a brake cylinder having a valve, a clutch cylinder having a valve, the valves being connected with the tank, pistons in the cylinders respectively, a brake control, means connecting the piston in the brake cylinder with the brake control to operate the latter, a clutch control, means for connecting the piston in the clutch cylinder with the clutch control for operating the latter, and pedals disposed close together and side by side to be operated by one foot, and operating means connecting the pedals with the valves respectively.

2. In a vacuum braking and clutch mechanism for an automotive vehicle driven by an internal combustion engine comprising a brake cylinder and a clutch cylinder, means connected with the cylinders in which pressure is reduced by the aid of fluids flowing under the influence of the engine, a valve at each cylinder at the connection between said means and the cylinders, means in said cylinders adapted to be operated by pressure therein to operate respectively a brake control and a clutch control, two pedals disposed close together and side by side, to be operated by one foot, and means connecting the pedals with the valves respectively for operating the latter.

3. In a vacuum braking and clutch mechanism for an automotive vehicle driven by an internal combustion engine comprising a brake cylinder and a clutch cylinder, means connected with the cylinders in which pressure is reduced by the aid of fluids flowing under the influence of the engine, a valve at each cylinder at the connection between said means and the cylinders, means in said cylinders adapted to be operated by pressure therein to operate respectively a brake control and a clutch control, two pedals disposed close together and side by side to be operated by one foot, and flexible members connecting the pedals with the valves for operating the latter.

4. In a vacuum braking and clutch mechanism for an automotive vehicle driven by an internal combustion engine comprising a brake cylinder and a clutch cylinder, means connected with the cylinders in which pressure is reduced by the aid of fluids flowing under the influence of the engine, a valve at each cylinder at the connection between said means and with said cylinders, one of the valves being provided with a passage normally connecting a cylinder with the atmosphere and which is adapted to be moved in one direction from such position to a position in which its passage connects the cylinder with the said means and beyond the second position to cut off all communication through the valve, means connected to the said valves for independent operation thereof, and means in said cylinders adapted to be operated by pressure therein to operate respectively a brake control and a clutch control.

MATHIAS LEUPOLD.